United States Patent
Suga

(10) Patent No.: US 6,222,943 B1
(45) Date of Patent: *Apr. 24, 2001

(54) IMAGE READING, PROCESSING AND RECORDING WITH QUICK DATA COMPRESSION

(75) Inventor: Akira Suga, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/622,181

(22) Filed: Mar. 25, 1996

Related U.S. Application Data

(63) Continuation of application No. 08/098,865, filed on Jul. 29, 1993, now abandoned.

(30) Foreign Application Priority Data

Jul. 30, 1992 (JP) .................................................... 4-203884
Jul. 31, 1992 (JP) .................................................... 4-205536

(51) Int. Cl.$^7$ ................................ G06K 9/36; G06K 9/46
(52) U.S. Cl. .......................... 382/239; 382/246; 382/251; 358/261.2; 358/430
(58) Field of Search .................................. 382/248, 251, 382/239, 246, 232, 238; 358/426, 432, 430, 433, 261.2; 348/384, 395, 405, 419

(56) References Cited

U.S. PATENT DOCUMENTS

| | | | |
|---|---|---|---|
| 4,920,426 | * | 4/1990 | Hatori .................................. 358/430 |
| 5,038,209 | * | 8/1991 | Hang .................................... 348/419 |
| 5,164,831 | * | 11/1992 | Kuchta .................................. 358/432 |
| 5,202,770 | * | 4/1993 | Murakami et al. ................... 358/430 |
| 5,216,518 | * | 6/1993 | Yamagami ............................ 348/384 |
| 5,245,427 | * | 9/1993 | Kunihiro ............................... 358/133 |
| 5,263,100 | * | 11/1993 | Kim et al. ............................. 382/239 |
| 5,291,282 | * | 3/1994 | Nakagawa et al. ................... 348/384 |
| 5,301,242 | * | 4/1994 | Gonzales et al. ..................... 382/239 |

* cited by examiner

Primary Examiner—Bhavesh Mehta
(74) Attorney, Agent, or Firm—Fitzpatrick, Cella, Harper & Scinto

(57) ABSTRACT

There is disclosed an image processing apparatus in which variable-length compression is performed, e.g. by orthogonally transforming input image data in units of frames, and quantizing the transformed image data. A quantization coefficient used in coding a last image on the basis of image data quantities of a plurality of frames which have been compressed, is controlled.

13 Claims, 12 Drawing Sheets

| $S_{00}$ | $S_{01}$ | $S_{02}$ | $S_{03}$ | $S_{04}$ | $S_{05}$ | $S_{06}$ | $S_{07}$ |
|---|---|---|---|---|---|---|---|
| $S_{10}$ | $S_{11}$ | $S_{12}$ | $S_{13}$ | $S_{14}$ | $S_{15}$ | $S_{16}$ | $S_{17}$ |
| $S_{20}$ | $S_{21}$ | $S_{22}$ | $S_{23}$ | $S_{24}$ | $S_{25}$ | $S_{26}$ | $S_{27}$ |
| $S_{30}$ | $S_{31}$ | $S_{32}$ | $S_{33}$ | $S_{34}$ | $S_{35}$ | $S_{36}$ | $S_{37}$ |
| $S_{40}$ | $S_{41}$ | $S_{42}$ | $S_{43}$ | $S_{44}$ | $S_{45}$ | $S_{46}$ | $S_{47}$ |
| $S_{50}$ | $S_{51}$ | $S_{52}$ | $S_{53}$ | $S_{54}$ | $S_{55}$ | $S_{56}$ | $S_{57}$ |
| $S_{60}$ | $S_{61}$ | $S_{62}$ | $S_{63}$ | $S_{64}$ | $S_{65}$ | $S_{66}$ | $S_{67}$ |
| $S_{70}$ | $S_{71}$ | $S_{72}$ | $S_{73}$ | $S_{74}$ | $S_{75}$ | $S_{76}$ | $S_{77}$ |

FIG. 9A

| $S_{00}$ | $S_{01}$ | $S_{02}$ | $S_{03}$ | $S_{04}$ | $S_{05}$ | $S_{06}$ | $S_{07}$ |
|---|---|---|---|---|---|---|---|
| $S_{10}$ | $S_{11}$ | $S_{12}$ | $S_{13}$ | $S_{14}$ | $S_{15}$ | $S_{16}$ | $S_{17}$ |
| $S_{20}$ | $S_{21}$ | $S_{22}$ | $S_{23}$ | $S_{24}$ | $S_{25}$ | $S_{26}$ | $S_{27}$ |
| $S_{30}$ | $S_{31}$ | $S_{32}$ | $S_{33}$ | $S_{34}$ | $S_{35}$ | $S_{36}$ | $S_{37}$ |
| $S_{40}$ | $S_{41}$ | $S_{42}$ | $S_{43}$ | $S_{44}$ | $S_{45}$ | $S_{46}$ | $S_{47}$ |
| $S_{50}$ | $S_{51}$ | $S_{52}$ | $S_{53}$ | $S_{54}$ | $S_{55}$ | $S_{56}$ | $S_{57}$ |
| $S_{60}$ | $S_{61}$ | $S_{62}$ | $S_{63}$ | $S_{64}$ | $S_{65}$ | $S_{66}$ | $S_{67}$ |
| $S_{70}$ | $S_{71}$ | $S_{72}$ | $S_{73}$ | $S_{74}$ | $S_{75}$ | $S_{76}$ | $S_{77}$ |

DCT COEFFICIENT

FIG. 9B

| $Q_{00}$ | $Q_{01}$ | $Q_{02}$ | $Q_{03}$ | $Q_{04}$ | $Q_{05}$ | $Q_{06}$ | $Q_{07}$ |
|---|---|---|---|---|---|---|---|
| $Q_{10}$ | $Q_{11}$ | $Q_{12}$ | $Q_{13}$ | $Q_{14}$ | $Q_{15}$ | $Q_{16}$ | $Q_{17}$ |
| $Q_{20}$ | $Q_{21}$ | $Q_{22}$ | $Q_{23}$ | $Q_{24}$ | $Q_{25}$ | $Q_{26}$ | $Q_{27}$ |
| $Q_{30}$ | $Q_{31}$ | $Q_{32}$ | $Q_{33}$ | $Q_{34}$ | $Q_{35}$ | $Q_{36}$ | $Q_{37}$ |
| $Q_{40}$ | $Q_{41}$ | $Q_{42}$ | $Q_{43}$ | $Q_{44}$ | $Q_{45}$ | $Q_{46}$ | $Q_{47}$ |
| $Q_{50}$ | $Q_{51}$ | $Q_{52}$ | $Q_{53}$ | $Q_{54}$ | $Q_{55}$ | $Q_{56}$ | $Q_{57}$ |
| $Q_{60}$ | $Q_{61}$ | $Q_{62}$ | $Q_{63}$ | $Q_{64}$ | $Q_{65}$ | $Q_{66}$ | $Q_{67}$ |
| $Q_{70}$ | $Q_{71}$ | $Q_{72}$ | $Q_{73}$ | $Q_{74}$ | $Q_{75}$ | $Q_{76}$ | $Q_{77}$ |

QUANTIZATION TABLE

FIG. 9C

| | | | | | | | |
|---|---|---|---|---|---|---|---|
| Sq00 | Sq01 | Sq02 | Sq03 | Sq04 | Sq05 | Sq06 | Sq07 |
| Sq10 | Sq11 | Sq12 | Sq13 | Sq14 | Sq15 | Sq16 | Sq17 |
| Sq20 | Sq21 | Sq22 | Sq23 | Sq24 | Sq25 | Sq26 | Sq27 |
| Sq30 | Sq31 | Sq32 | Sq33 | Sq34 | Sq35 | Sq36 | Sq37 |
| Sq40 | Sq41 | Sq42 | Sq43 | Sq44 | Sq45 | Sq46 | Sq47 |
| Sq50 | Sq51 | Sq52 | Sq53 | Sq54 | Sq55 | Sq56 | Sq57 |
| Sq60 | Sq61 | Sq62 | Sq63 | Sq64 | Sq65 | Sq66 | Sq67 |
| Sq70 | Sq71 | Sq72 | Sq73 | Sq74 | Sq75 | Sq76 | Sq77 |

QUATIZED DCT COEFFICIENT $Q'vu = Qvu \times F$
$Sqvu = ROUND(Svu/Q'vu)$

FIG. 10A

FIG. 10B $Sq00, Sq01, Sq10, Sq20, \cdots\cdots Sqij, 0, 0, \cdots, 0, Sqki, 0, 0, \cdots 0, Sqmn, 0, 0, \cdots, 0$

↑ DC COEFFICIENT     ↑ AC COEFFICIENT

IMAGE READING, PROCESSING AND RECORDING WITH QUICK DATA COMPRESSION

This application is a continuation of application Ser. No. 08/098,865 filed Jul. 29, 1993, now abandoned.

BACKGROUND OF THE INVENTION

1. Field of the Invention

The present invention relates to an image recording method and apparatus for digital-recording a plurality of frames of image data, an image processing apparatus, and an image reading method for reading an image.

2. Related Background Art

Conventionally, a technique for compressing a plurality of frames of image data, and recording compressed image data on a recording medium is known.

As an example of such a technique, a compression method for orthogonally transforming input image data, and quantizing converted coefficients, e.g., a compression method called a JPEG method, is known.

When a plurality of input image data are compressed to fixed-length data using such a compression method, if the code quantity assigned per image is represented by L, a two-pass compression method is repetitively performed from the beginning to the end of continuous photographing operations of n images, to keep code quantities $L_1$ to $L_n$ of the n images equal to or smaller than the code quantity L.

However, in this prior art approach, since two-step coding is performed in each photographing operation in a continuous recording mode, the data compression operation requires much time, and limits any increase in continuous recording speed which might otherwise be achievable.

More specifically, in the above-mentioned method, in order to limit input image data to a predetermined code quantity, compression must be attempted several times while changing quantization coefficients, resulting in the long data compression time. In particular, this method limits an increase in speed in continuous photographing operations.

SUMMARY OF THE INVENTION

It is an object of the present invention to provide an image processing apparatus and method, which can perform high-speed continuous recording operations in consideration of the above-mentioned situation.

It is another object of the present invention to provide an image processing method and apparatus, which can attain a substantially fixed compression ratio.

In order to achieve the above objects, according to a preferred aspect of the present invention, there is disclosed an image processing apparatus comprising compression means for performing variable-length data compression by orthogonally transforming input image data in units of frames (image planes), and quantizing the transformed data, and control means for, when a series of a plurality of frames of image data are compressed, controlling the compression means on the basis of the data quantities of a plurality of frames compressed by the compression means.

It is still another object of the present invention to provide an image reading method and apparatus, which can reduce a time lag from an input of a recording instruction until a coding operation ends in practice.

It is still another object of the present invention to provide an image processing apparatus having novel functions.

Other objects and features of the present invention will become apparent from the following description of the embodiment taken in conjunction with the accompanying drawings.

BRIEF DESCRIPTION OF THE DRAWINGS

FIGS. 9A to 9C are views showing DCT coefficients in units of blocks;

FIGS. 10A and 10B are views for explaining a method of coding quantized DCT coefficients;

DETAILED DESCRIPTION OF THE PREFERRED EMBODIMENTS

Figure 3:
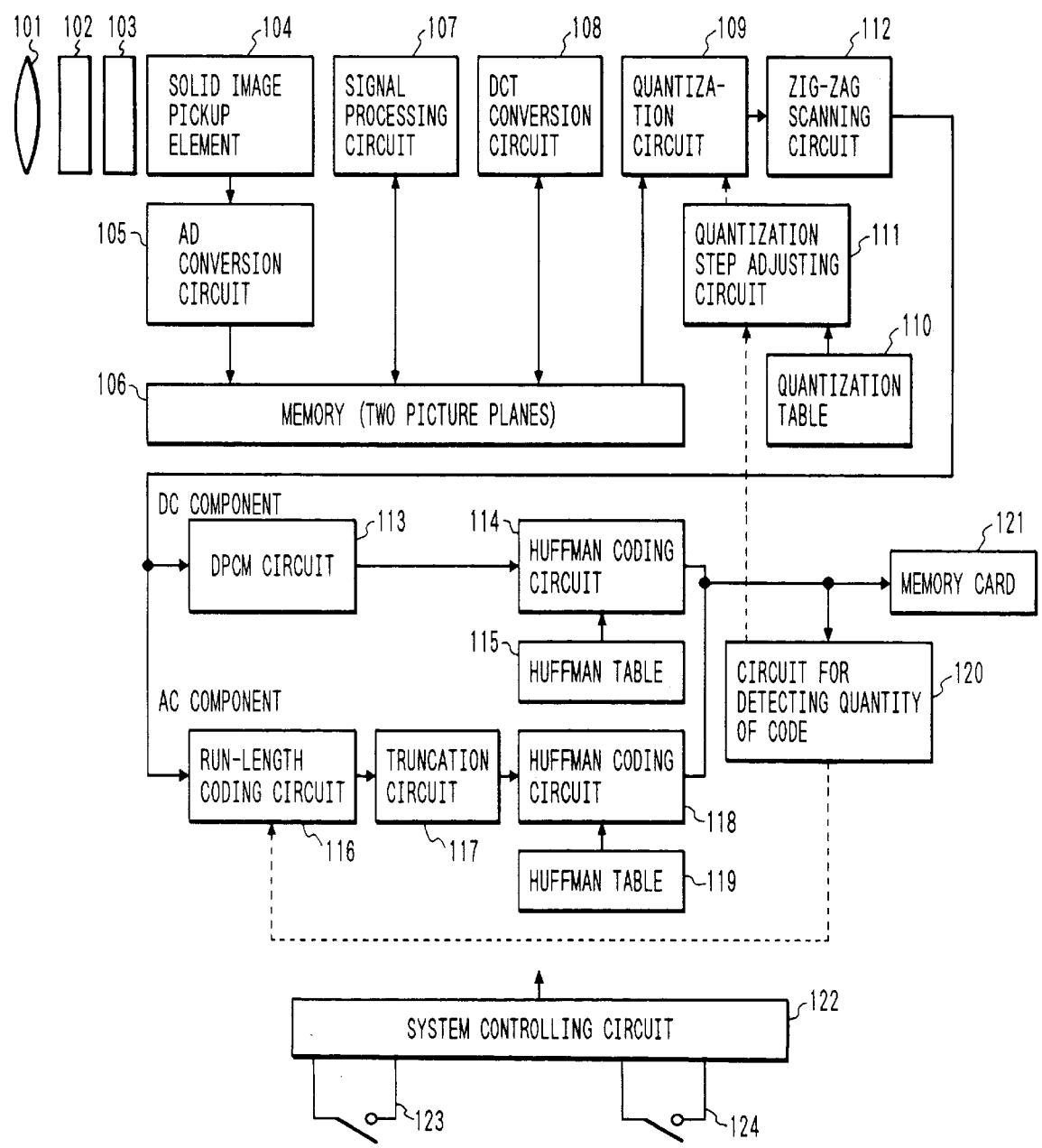
FIG. 3 is a block diagram of an electronic still camera according to the first embodiment.

FIG. 3 is a block diagram of an electronic still camera as an image recording apparatus according to the first embodiment of the present invention. The camera comprises a lens 101, an aperture 102, a shutter 103, a solid state image pickup element 104 for converting an image into an electrical signal, an AD conversion circuit 105 for AD-converting an output from the solid state image pickup element, and a memory 106 for temporarily storing data so as to process the AD-converted signal. The camera also comprises the following components. A signal processing circuit 107 calculates a luminance signal and color difference signals from an output from the solid state image pickup element 104 read out from the memory 106, and stores the calculation results in the memory 106. A DCT (discrete cosine transform) conversion circuit 108 divides a signal from the memory 106 into 8×8 blocks, DCT-converts each block into 8×8 DCT coefficients, and stores the coefficients in the memory 106. A quantization circuit 109 quantizes the DCT coefficients so as to compress the code quantity of the DCT coefficients read out from the memory 106. A quantization table 110 sets quantization coefficients used in quantization of the DCT coefficients. A quantization step adjusting circuit 111 adjusts the quantization step by multiplying the coefficients in the quantization table with coefficients. A zigzag scanning circuit 112 zigzag-scans the quantized DCT coefficients in units of blocks. A DPCM circuit 113 performs another compression of the data quantity by calculating a difference in DC components of the DCT coefficients between blocks. A Huffman coding circuit 114 Huffman-codes an output from the DPCM circuit. A Huffman table 115 is referred to in performing the Huffman coding. A run-length coding circuit 116 counts an interval between non-zero coefficients, i.e., a run length of zeros, in AC components of zigzag-scanned DCT coefficients. A truncation circuit 117 forcibly sets high-order coefficients to be zero when a code length assigned to each block is about to be exceeded. A Huffman coding circuit 118 assigns Huffman codes to a zero run length and non-zero coefficients. A Huffman table 119 is referred to by the Huffman coding circuit. A circuit 120 detects a quantity of codes (to be referred to as code quantity detecting circuit 120 hereinafter). A memory card 121 records compression-coded data. Coefficient values to be multiplied with coefficients in the quantization table in the quantization step adjusting circuit 111 and a code quantity to be assigned to each block are determined so as to attain a target code quantity on the basis of the code quantity detected by the code quantity detecting circuit 120. In this embodiment, when the code quantity is about to exceed a designated quantity, high-order coefficients of AC coefficients are forcibly set to be zero, thus truncating coding. The camera further comprises a system controlling circuit 122 for controlling the operation of the entire system, a release switch 123 for starting a photographing operation, and a mode change switch 124 for selecting a continuous photographing mode when it is ON; selecting a single photographing mode when it is OFF.

Figure 4:
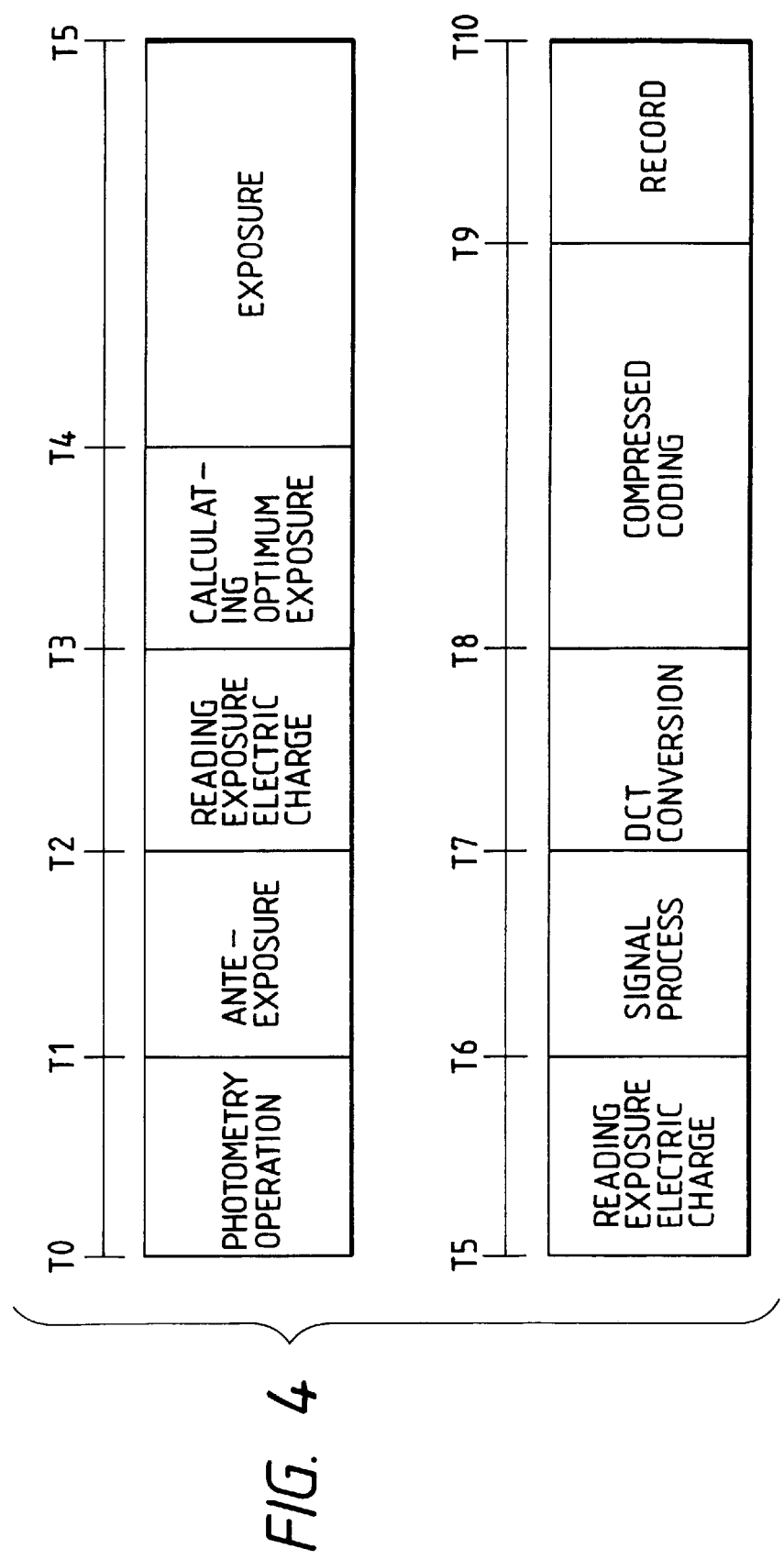
FIG. 4 is a chart showing an image pickup sequence for photographing a single image.

FIG. 4 is a chart showing an image pickup sequence for photographing a single image. When the release switch 123 is turned on at time T0, a photometry operation is performed during a time interval from time T0 to time T1, and a roughly proper shutter speed and aperture value are determined. An ante-exposure operation is performed by opening the shutter 103 during a time interval from time T1 to time T2. After the shutter 103 is closed at time T2, an exposure electric charge is read. An optimum exposure amount is calculated based on the actual exposure electric charge information during a time interval from time T3 to time T4. At time T4, the shutter 103 is opened again to perform a main exposure operation. During a time interval from time T5 to time T6, an exposure electric charge is read, is AD-converted by the AD conversion circuit 105, and is stored in the memory 106. During a time interval from time T6 to time T7, data is read out from the memory 106 to the signal processing circuit 107, thereby generating a luminance signal (Y), a color difference signal (R-Y), and a color difference signal (B-Y). During a time interval from time T7 to time T8, DCT conversion is performed by the DCT conversion circuit 108. During a time interval from time T8 to time T9, compression coding is performed by a method to be described later. A compressed image signal is recorded in the memory card 121 during a time interval from time T9 to time T10.

Figures 8A, 8B:
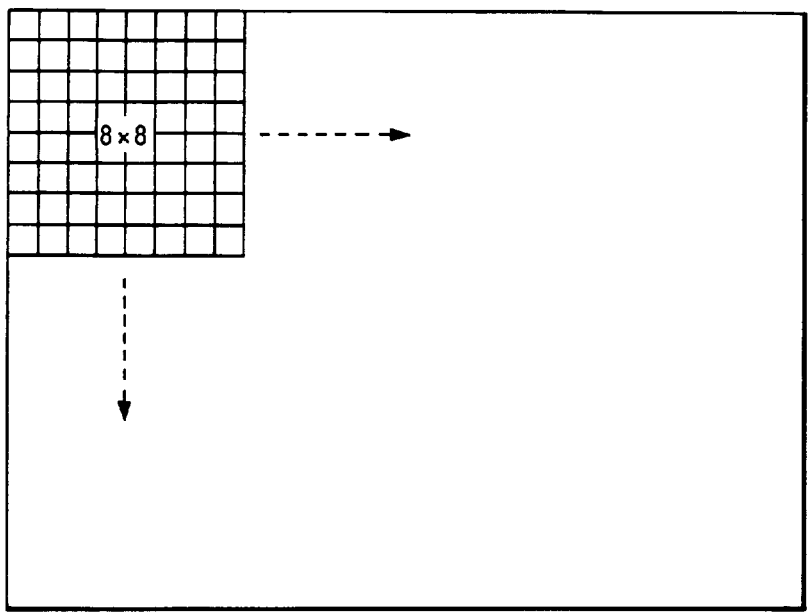
FIGS. 8A and 8B are views showing an image divided into blocks.

Prior to a DCT calculation performed upon compression, image data is normally divided into blocks each consisting of 8×8 pixels. FIGS. 8A and 8B show an image divided into blocks. As shown in FIG. 8A, an image is divided into blocks each consisting of 8×8 blocks in turn from the upper left portion of a frame, and pixels in units of blocks are indexed by $S_{00}$ to $S_{77}$, as shown in FIG. 8B. FIGS. 9A to 9C show DCT coefficients in units of blocks. When 8×8 pixel signals shown in FIG. 8B are subjected to a DCT calculation given by the following equation (1), 8×8 DCT coefficients $S_{00}$ to $S_{77}$ are obtained, as shown in FIG. 9A. An inverse DCT calculation is given by equation (2) below.

$$S_{vu} = \frac{1}{4} C_u C_v \sum_{x=0}^{7} \sum_{y=0}^{7} s_{yx} \cos\frac{(2x+1)u\pi}{16} \cos\frac{(2y+1)v\pi}{16} \quad (1)$$

$$S_{yx} = \sum_{x=0}^{7} \sum_{y=0}^{7} C_u C_v S_{uv} \cos\frac{(2x+1)u\pi}{16} \cos\frac{(2y+1)v\pi}{16} \quad (2)$$

Quantized DCT coefficients $Sq_{00}$ to $Sq_{77}$ are obtained by dividing DCT coefficients corresponding to indices by $Q'_{00}$ to $Q'_{77}$ obtained by multiplying coefficients $Q_{00}$ to $Q_{77}$ shown in a quantization table in FIG. 9B with a quantization step correction coefficient F.

FIGS. 10A and 10B are views for explaining a method of coding quantized DCT coefficients. The quantized DCT coefficients $Sq_{00}$ to $Sq_{77}$ are zigzag-scanned in the order shown in FIG. 10A. In this manner, the DCT coefficients are sorted from $Sq_{00}$ indicating a DC component of the block in the ascending order of spatial frequency. With this zigzag scan, as shown in FIG. 10B, $Sq_{00}$ indicating a DC component, i.e., a DC coefficient, and AC coefficients $Sq_{01}$ to $Sq_{77}$ indicating AC components are aligned. As a nature of a general image, an energy component having a high spatial frequency will often become small, and AC coefficients of high-frequency components often become zero by the above-mentioned quantization. Therefore, by Huffman-coding a pair of a run length of zeros between non-zero coefficients of zigzag-scanned AC coefficients, and a non-zero coefficient following the zeros, the data quantity of the AC coefficients can be compressed. On the other hand, the data quantity of a DC coefficient is compressed by Huffman-coding a DPCM predicted value as a difference from a DC coefficient of an adjacent block. In this case, the code quantity increases/decreased depending on the way of quantization. If coarse quantization is performed, since AC coefficients include many zero components, the data quantity decreases, but image quality deteriorates.

Figure 5:
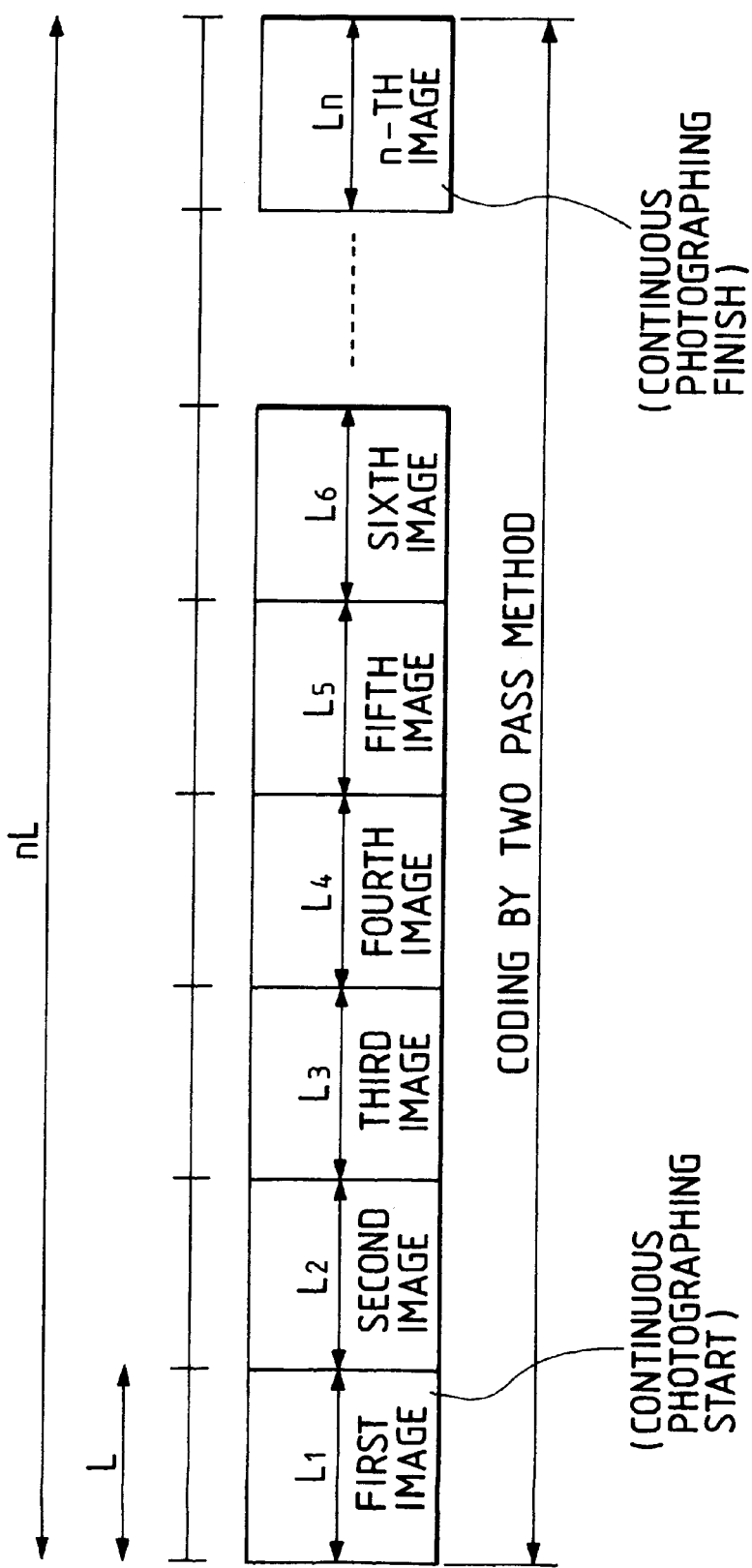
FIG. 5 is a chart showing a sequence as a comparative example of the present invention upon executing compressed coding when a switch 124 is set in a continuous photographing mode.
Figure 6:
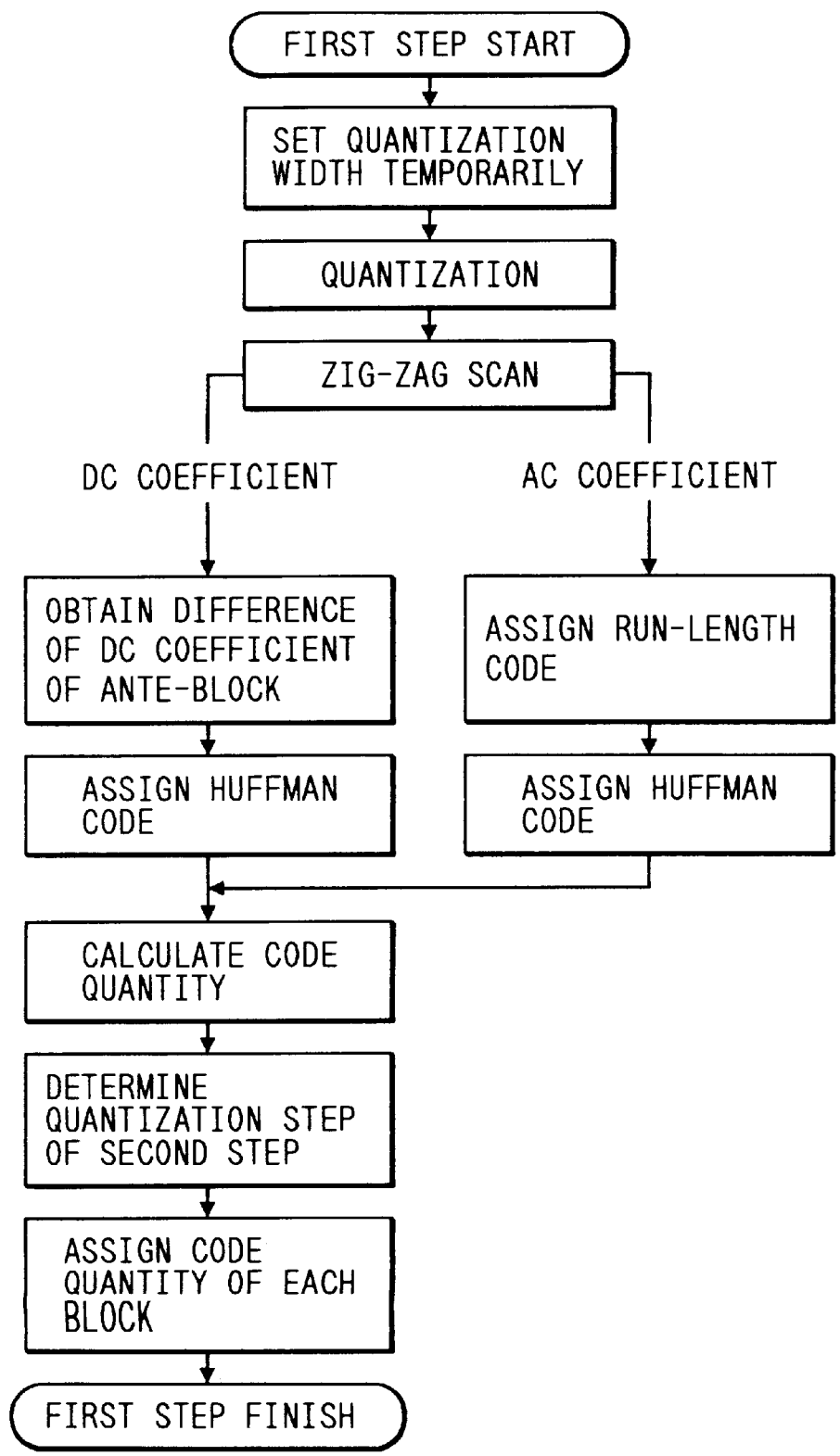
FIG. 6 is a flow chart showing the first step of a two-pass method.
Figure 7:
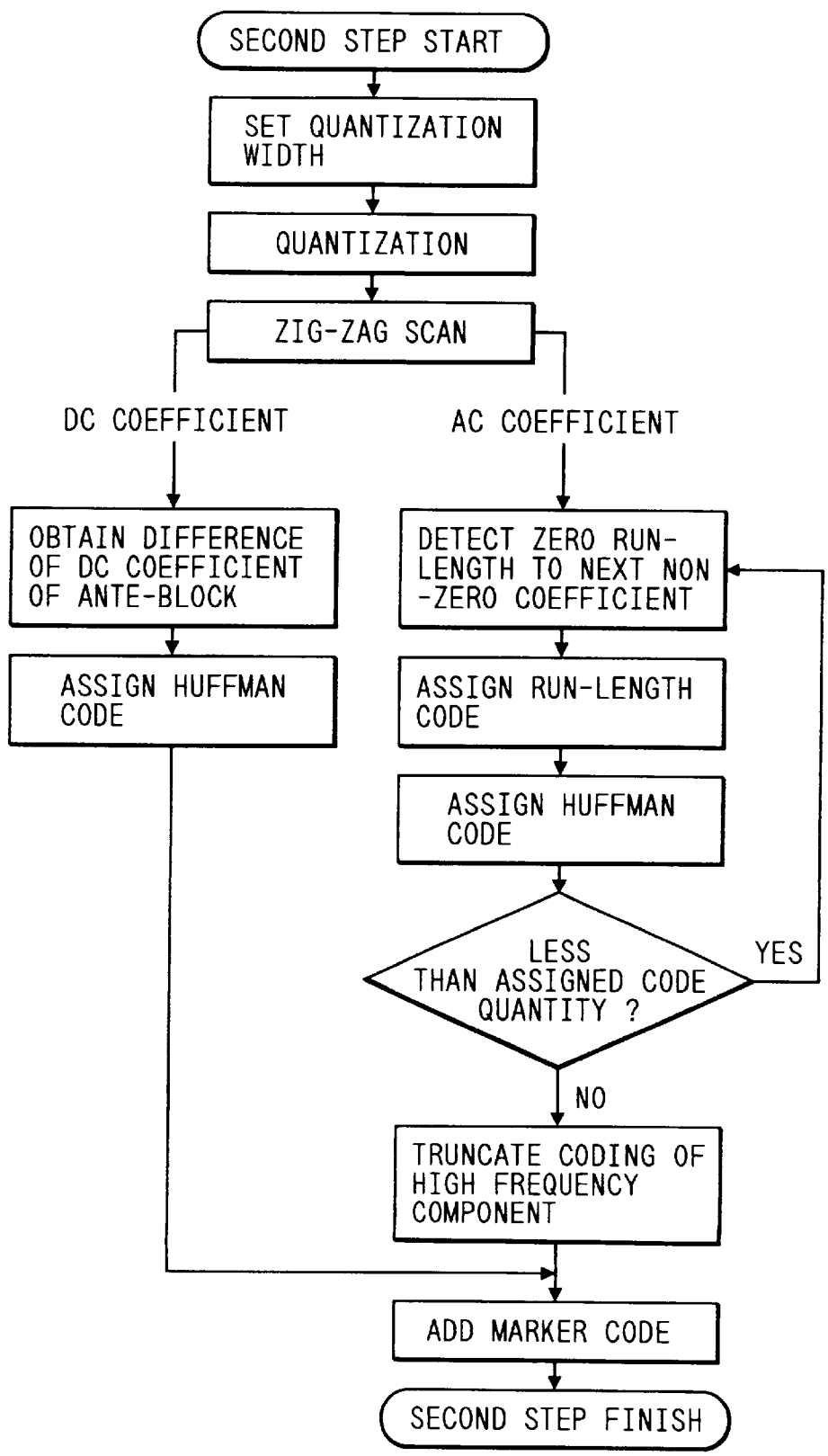
FIG. 7 is a flow chart showing the second step of the two-pass method.

FIG. 5 is a chart showing a sequence as a comparative example for presenting the effect of this embodiment upon execution of compressed coding when the switch 124 is set in a continuous photographing mode. Coding using DCT is basically variable-length coding. However, a certain fixed-length coding method is normally adopted to record a predetermined number of images in a card. In order to achieve such fixed-length coding, a two-pass method is known. FIGS. 6 and 7 show an algorithm of the two-pass method. FIG. 6 shows the first step of the two-pass method, and FIG. 7 shows the second step of the two-pass method.

A fixed-length coding method will be briefly described below with reference to FIGS. 6 and 7. Prior to coding, a DCT calculation is performed to convert image data of each block into DCT coefficients, and the DCT coefficients are stored in the memory. In the first step, a quantization width is set by temporarily setting a quantization step correction coefficient F for the quantization table. Then, quantization, zigzag scan, and coding are performed. The code quantity of each block is calculated to predict a quantization step correction coefficient F in the second step so that the code quantity of the entire image becomes a target code quantity, and a maximum code quantity is assigned to each block so as to achieve the target code quantity, thus finishing the first step. In the second step, the quantization width is set based on the quantization step correction coefficient F set in the first step, and quantization, zigzag scanning, and coding are performed. Upon coding of AC coefficients, when the code quantity is about to exceed an assigned quantity of each block, coding of high-frequency components of the block is truncated to prevent the code quantity from exceeding a preset code quantity, thus achieving fixed-length coding. Various marker codes required in decoding are added to encoded data, thus finishing the second step.

In the above-mentioned method of the comparative example, since data compression is performed after two-step coding, the time required for data compression is prolonged.

Figure 1:
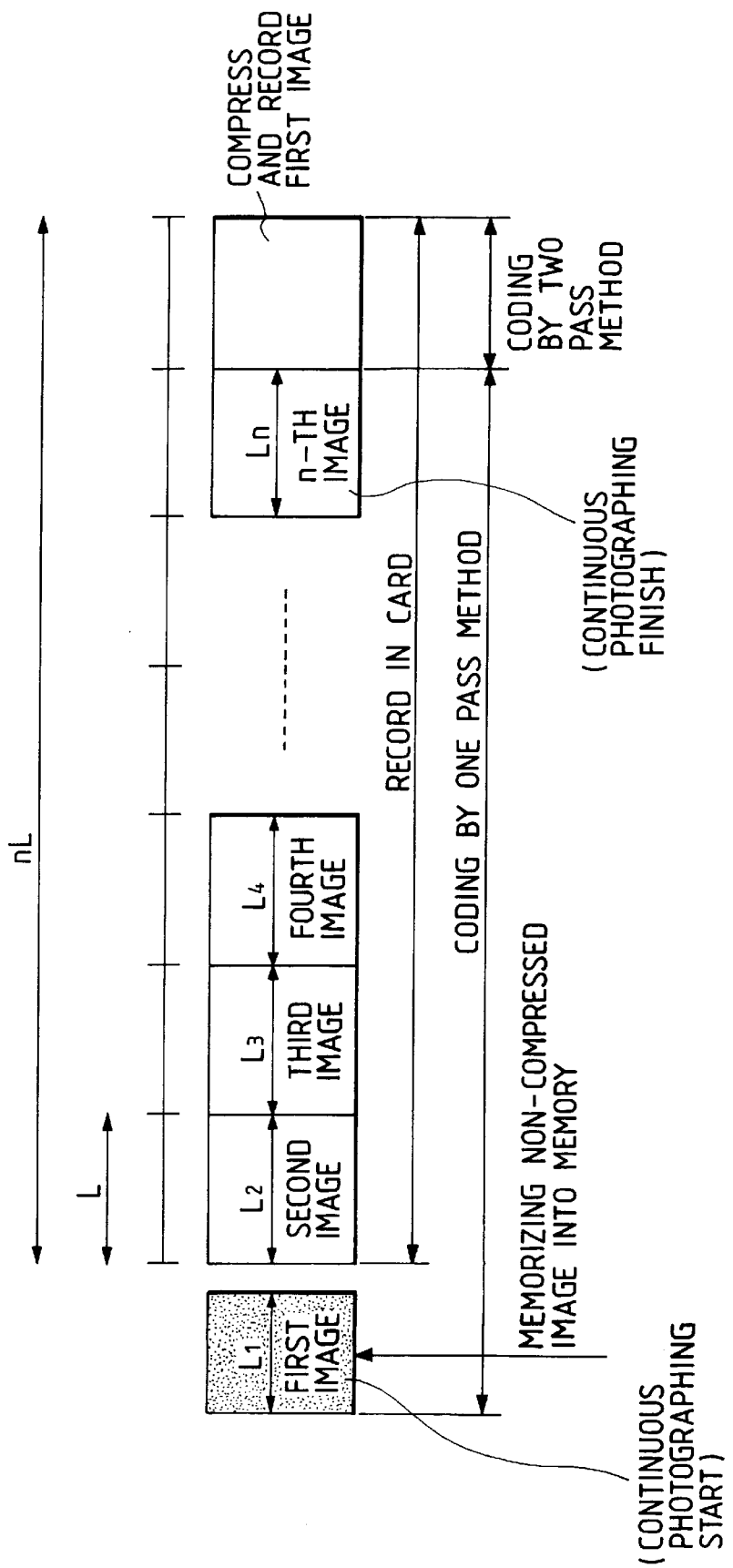
FIG. 1 is a chart showing a coding sequence in a continuous photographing mode according to the first embodiment of the present invention.
Figure 2:
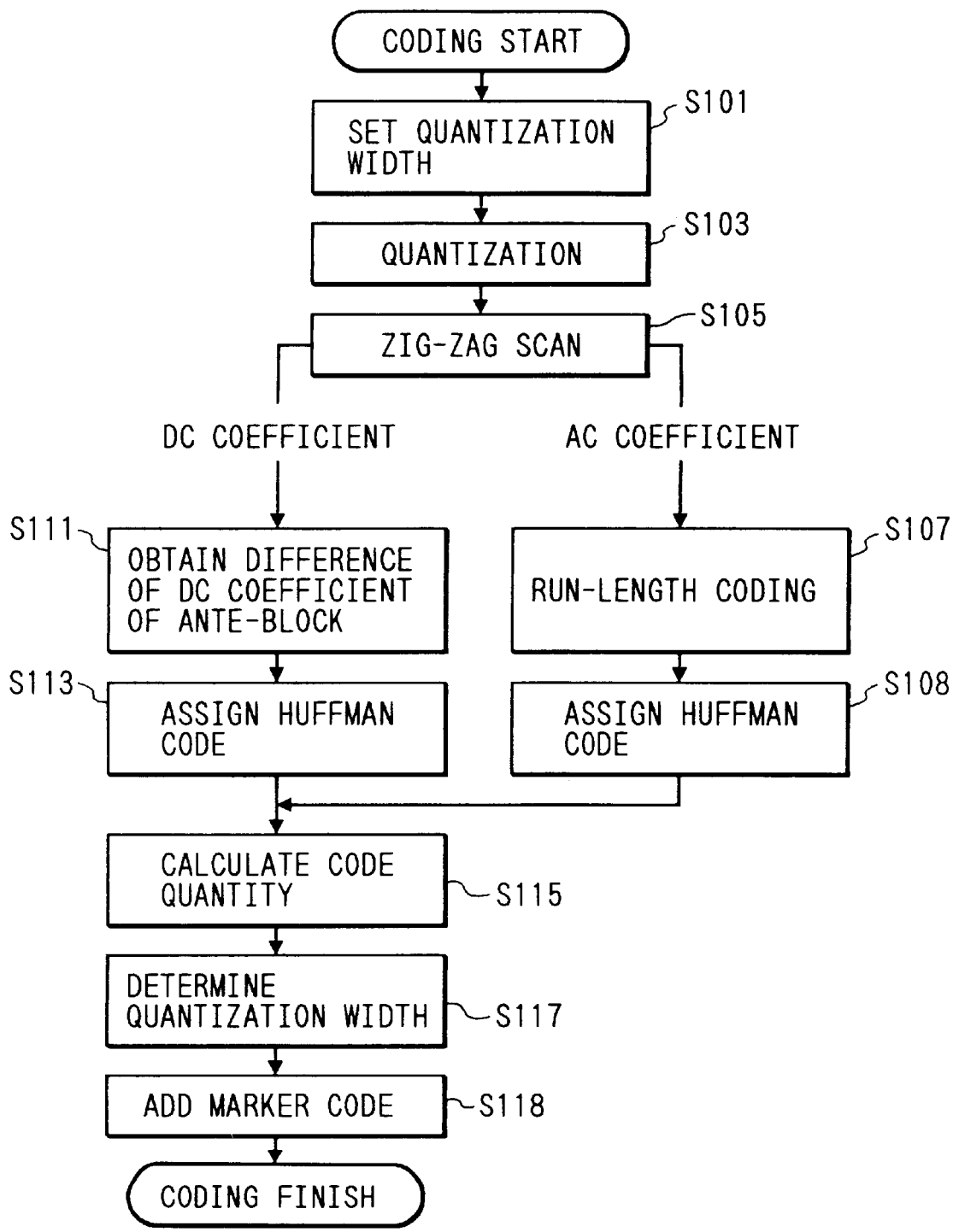
FIG. 2 is a flow chart showing coding by a one-pass method.

A coding sequence in a continuous photographing mode according to the first embodiment of the present invention will be described below with reference to FIG. 1. FIG. 2 is a flow chart showing coding by a one-pass method.

The operation of the first embodiment of the present invention will be described below with reference to FIGS. 1 and 2. When the release switch 123 is turned on while the mode change switch 124 is set in the continuous photographing mode, a continuous photographing operation is started. In the apparatus of this embodiment, the first image in the continuous photographing operation is coded by the one-pass method. Coding of the one-pass method is performed in a procedure shown in FIG. 2. More specifically, the quantization step correction coefficient F is set in advance to be a predetermined value (S101), and quantization (S103), zigzag scanning (S105), coding (S107 to S113), addition of marker codes (S119), and calculation of a code quantity (S115) are performed. The operation in the continuous photographing mode will be described below with reference to FIG. 1. In this case, since the code quantity obtained by compressing the first image does not often coincide with a quantity assigned to each image, the first image is not recorded in the card. If the code quantity of an image assigned to each image is represented by L, an empty space L is assured on the card, and non-compressed image data is temporarily stored in the memory 106 until the end of the continuous photographing operation. Note that the memory 106 has enough capacity for two images. In the first image compression process, the quantization width (step) of the next image is determined. In the continuous photographing mode, since patterns do not largely change between two adjacent images, the quantization step for compression of the next image to be photographed can be determined to be an almost proper value by evaluating the image to be recorded first. If the code quantity of an image assigned to each image is represented by L, a code quantity obtained upon compression of the first image of the continuous photographing operations does not often coincide with L. However, as described above, since the quantization width (step) determined in the first image compression process is used, the code quantities of the second and subsequent images in the continuous photographing mode can be set to be almost equal to L. When the release switch 123 is turned off, the continuous photographing operation is finished. If the number of continuously photographed images is represented by n, the code quantity assigned to each image is represented by L, the code quantity of the second image is represented by $L_2$, and the code quantity of an n-th image is represented by $L_n$, compressed coding is performed by the above-mentioned two-pass method, so that $L_1$ becomes equal to a code quantity obtained by subtracting a sum of code quantities $L_2$ to $L_n$ from a product nL of assigned code quantities per image in the continuous photographing mode.

Figure 11:
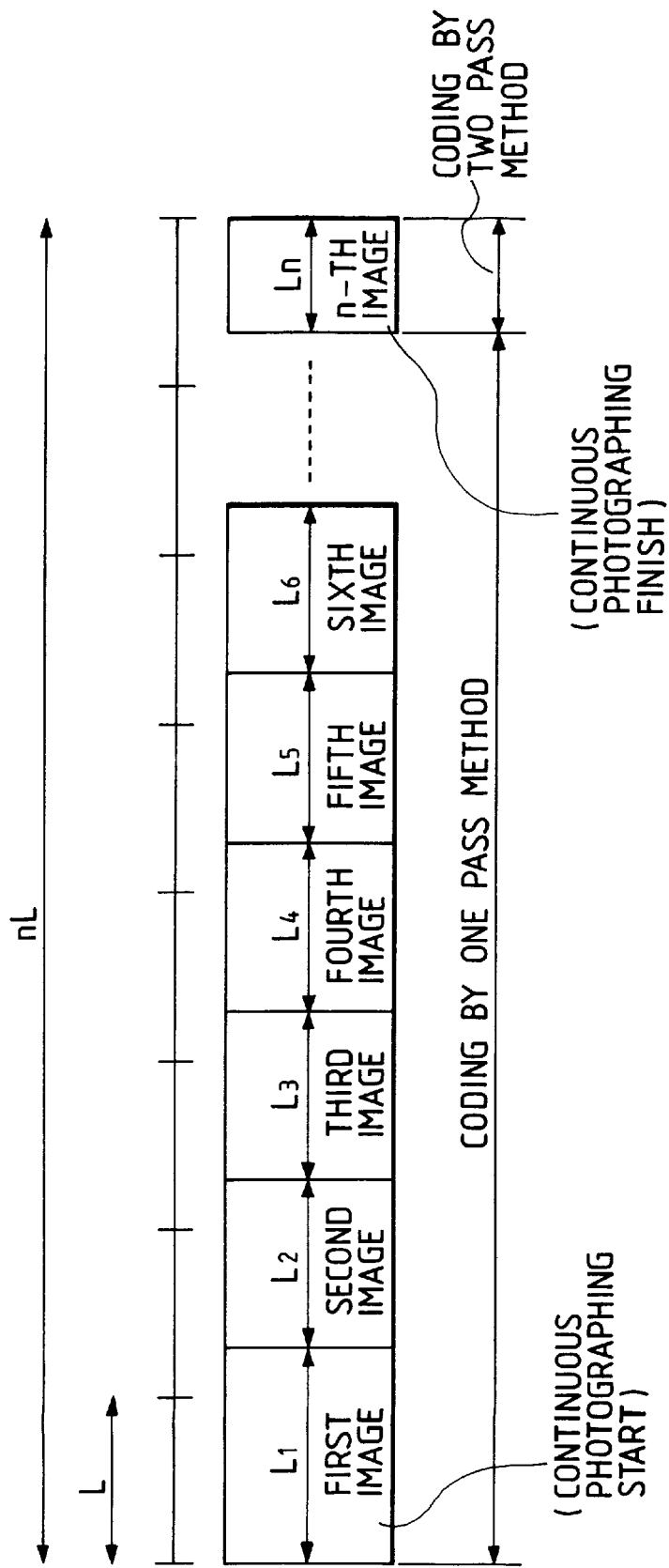
FIG. 11 is a chart showing a sequence according to the second embodiment of the present invention.

FIG. 11 is a chart showing a coding sequence in a continuous photographing mode according to the second embodiment of the present invention.

The operation of this embodiment will be described below with reference to FIGS. 11 and 2. When the release switch 123 is turned on while the mode change switch 124 is set in the continuous photographing mode, a continuous photographing operation is started. In this case, the first image is coded by the above-mentioned one-pass method shown in FIG. 2. In this embodiment, as shown in FIG. 11, if the code quantity assigned to each image is represented by L, the quantization step correction coefficient F is set, so that the code quantity of the first image becomes sufficiently smaller than 2L. Note that even when the compressed code quantity of the first image does not coincide with the quantity L assigned to each image, the compressed data is recorded. In the compression process of the first image, the quantization width of the next image is determined. In the continuous photographing mode, since patterns do not largely change between two adjacent images, the quantization step for compression of the next image to be photographed can be determined to be an almost proper value by evaluating the image to be recorded first. If the code quantity assigned to each image is represented by L, although the code quantity of the first image in the continuous photographing mode does not often coincide with L, the code quantity of the second and subsequent images can be set to be almost equal to L. When the release switch 123 is turned off, the continuous photographing operation is finished. If the number of continuously photographed images is represented by n, the code quantity assigned to each image is represented by L, the code quantity of the first image is represented by $L_1$, the code quantity of the (n−1)-th image is represented by $L_{(n-1)}$, and the code quantity of the n-th image is represented by $L_n$, compressed coding is performed by the two-pass method, so that $L_n$ becomes equal to a code quantity obtained by subtracting a sum of code quantities $L_1$ to $L_{(n-1)}$ from a code quantity as a product nL of code quantities assigned to each image in the continuous photographing mode.

Since the last image before the end of the continuous photographing operation is compressed after the end of continuous photographing operation, this operation can take a relatively long period of time. Therefore, in place of the two-pass method, coding by the one-pass method may be repeated while changing the quantization step correction coefficient F until the code quantity converges to $L_n$.

The present invention is not limited to an electronic still camera but may be applied to an image filing apparatus, a color copying machine, and the like.

According to this embodiment, the time required for performing data compression coding of a code quantity per image in the continuous recording mode can be shortened, and the continuous recording speed can be increased.

A photographing sequence according to the third embodiment of the present invention will be described below with reference to FIG. 12.

The hardware arrangement of this embodiment is the same as that of the embodiment shown in FIG. 3, and a detailed description thereof will be omitted. This embodiment adopts a different procedure of a photographing sequence, as shown in FIG. 12.

Figure 12:
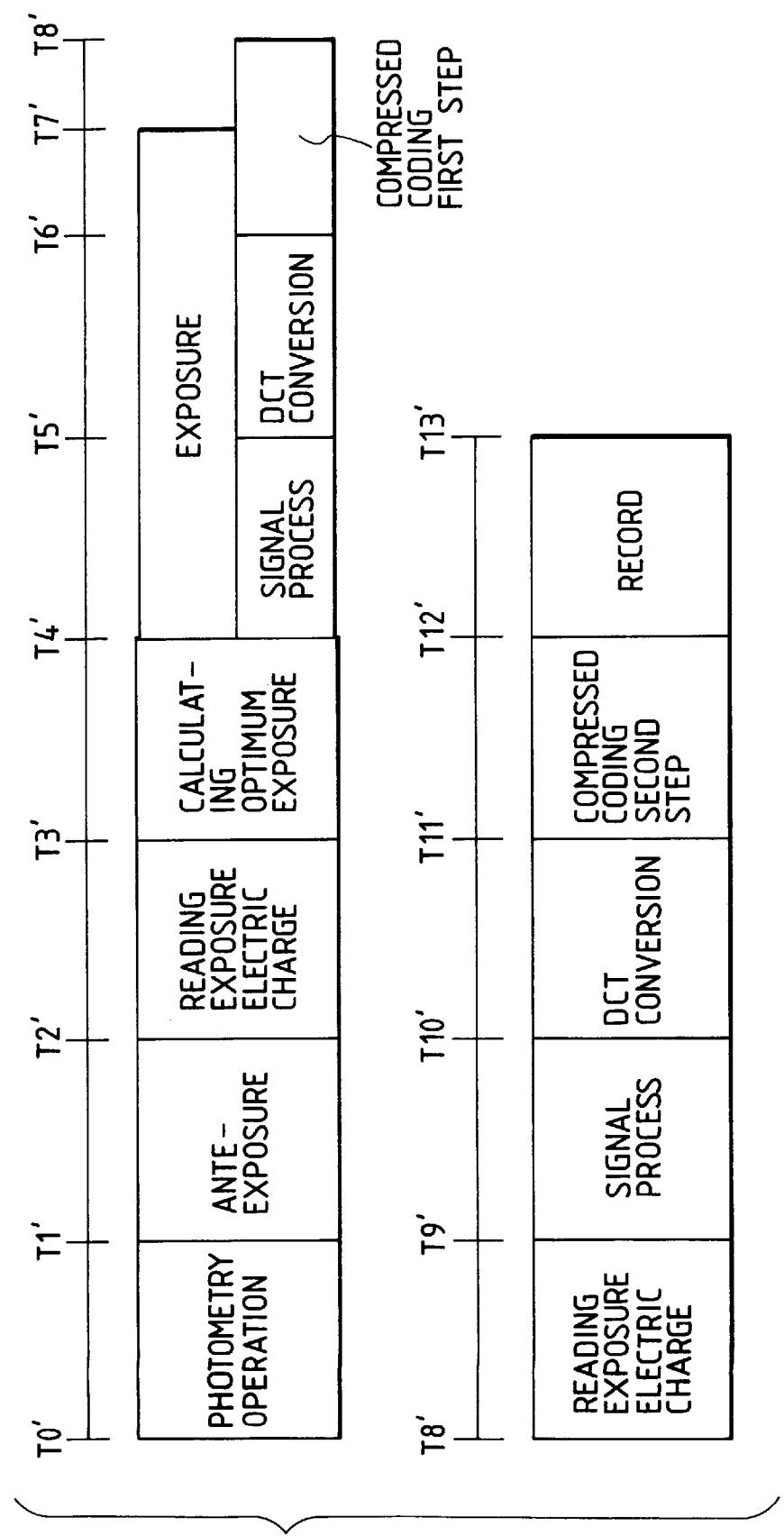
FIG. 12 is a chart showing a sequence according to the third embodiment of the present invention.

FIG. 12 is a chart showing a photographing sequence according to the third embodiment of the present invention.

The operation of this embodiment will be described below with reference to FIG. 12.

The operations up to time T4' are the same as those up to time T4 in FIG. 4. At time T4', the shutter 103 is opened to start a main exposure operation. At the same time, a signal exposed in the ante-exposure operation is read out from the memory 106, and is subjected to a signal processing operation. During a time interval from time T5' to time T6', DCT conversion is performed. During a time interval from time T6' to time T8', the operations in the first step of compressed coding by the two-pass method shown in FIG. 6 are performed. The main exposure operation ends at time T7' (in some cases, the main exposure operation may end after the end of the first step of compressed coding depending on the exposure time). During a time interval from time T8' to T9', an exposure electric charge is read, and during a time interval from time T9' to time T10', a signal process for the main exposure signal is performed. Then, during a time interval from time T10' to T11', DCT conversion, and during a time interval from time T11' to time T12', the operations in the second step of compressed coding shown in FIG. 7 are performed. During a time interval from time T12' to time T13', compressed data is recorded in the memory card 121. Since an image in the ante-exposure mode is almost equal to that in the main exposure mode, the time required for compression can be shortened by calculating an optimum quantization step for the main exposure mode on the basis of ante-exposure data during the main exposure operation.

In the above embodiments, DCT is used as an orthogonal transform method. However, the present invention is not limited to this. For example, Hadamard transform or K-L transform may be adopted.

In the above embodiments, the present invention is applied to an electronic still camera. However, the present invention is not limited to the electronic still camera, but may be similarly applied to an original reader as OA equipment such as a flat-bed scanner.

According to this embodiment, the time required for compression can be shortened, and the time required for data compression coding can be shortened, thus increasing the continuous photographing speed.

What is claimed is:

1. An image processing apparatus comprising:
   a) compression means for performing variable-length data compression of input image data for n frames (where n is an integral number);
   b) detecting means for detecting a difference between a prediction coded data quantity of the n frames and a sum of coded data amount of (n−1) frames which are actually coded; and
   c) control means for controlling a compression state, for at least one frame of the n frames, of said compression means on the basis of a detection output of said detecting means, wherein, for n>2, each of the n−1 frames are coded on the basis of a result of coding the n-th frame without reference to any other frame.

2. An apparatus according to claim 1, wherein said compression means includes:
   conversion means for performing orthogonal transformation of the image data; and
   means for quantizing the image data orthogonally transformed by said conversion means using variable quantization coefficients.

3. An apparatus according to claim 1, further comprising:
   storage means for storing the image data compressed by said compression means in a medium having a predetermined storage capacity.

4. An apparatus according to claim 1, wherein said control means controls said compression means on the basis of a total of data quantities of the plurality of frames.

5. An apparatus according to claim 1, wherein said compression means compresses a first frame at a relatively high compression ratio.

6. An apparatus according to claim 1, wherein said control means controls said compression means on the basis of the image data of the plurality of frames compressed by said compression means when image data of the last frame of the series of the plurality of frames is compressed.

7. An image processing apparatus comprising:
   a) compression means for performing variable-length data compression of input image data for n frames (n is an integral number);
   b) recording means for recording the image data compressed by said compression means in a recording medium;
   c) memory means for memorizing a first frame of the n frames; and
   d) control means for controlling coding for the first frame on the basis of a difference between a prediction coded data quantity of the n frames and a sum of coded data amount for a second frame to n-th frame of the n frames, the amount representing an actual code length of coded data, wherein, for n>2, each of the n−1 frames are coded on the basis of a result of coding the n-th frame without reference to any other frame.

8. An apparatus according to claim 7, wherein said compression means includes:
   conversion means for performing orthogonal transformation of the image data; and
   means for quantizing the image data orthogonally transformed by said conversion means using variable quantization coefficients.

9. An apparatus according to claim 7, wherein said control means controls to compress the first frame of image data held in the medium, and to record the compressed data in the recording medium.

10. An apparatus according to claim 7, wherein said compression means is means for compressing the second and subsequent frames of image data on the basis of a result of compressing the first frame of image data.

11. An apparatus according to claim 7, further comprising:
    generation means for generating the image data in units of frames.

12. An apparatus according to claim 11, wherein said generation means includes means for photoelectrically converting an image.

13. An apparatus according to claim 7, wherein said control means causes said compression means to compress the second and subsequent frames of image data, and determines a compression ratio of the first frame of image data in accordance with quantities of the compressed image data when the plurality of frames of image data are continuously recorded.

\* \* \* \* \*

UNITED STATES PATENT AND TRADEMARK OFFICE
CERTIFICATE OF CORRECTION

PATENT NO. : 6,222,943 B1
DATED : April 24, 2001
INVENTOR(S) : Suga

It is certified that error appears in the above-identified patent and that said Letters Patent is hereby corrected as shown below:

Title page,
Item [57], ABSTRACT,
Line 2, "e.g." should read -- e.g., --.

Drawings,
Sheet 10, Fig. 9C, "QUATIZED DCT COEFFICIENT" should read -- QUANTIZED DCT COEFFICIENT --.

Column 4,
Equation (2), "$S_{yx} = \sum_{x=0}^{7} \sum_{y=0}^{7}$" should read -- $S_{yx} = \sum_{u=0}^{7} \sum_{v=0}^{7}$ --.

Line 34, "increases/decreased" should read -- increases/decreases --; and
Line 57, "scan," should read -- scanning --.

Column 6,
Line 37, "of" should read -- of the --.

Column 7,
Line 12, "conversion," should read -- conversion is performed, --.

Column 8,
Line 14, "(n" should read -- (where n --; and
Line 29, "are" should read -- is --.

Signed and Sealed this

Seventh Day of May, 2002

Attest:

JAMES E. ROGAN
*Attesting Officer*  *Director of the United States Patent and Trademark Office*